(12) United States Patent
Hubel

(10) Patent No.: US 6,985,622 B2
(45) Date of Patent: Jan. 10, 2006

(54) SYSTEM AND METHOD FOR COLOR CORRECTING ELECTRONICALLY CAPTURED IMAGES BY DETERMINING INPUT MEDIA TYPES USING COLOR CORRELATION MATRIX

(75) Inventor: Paul M. Hubel, Mountain View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 753 days.

(21) Appl. No.: 09/960,777

(22) Filed: Sep. 21, 2001

(65) Prior Publication Data

US 2003/0059108 A1 Mar. 27, 2003

(51) Int. Cl.
*G06K 9/00* (2006.01)
(52) U.S. Cl. .................. 382/165; 382/224; 250/559.05
(58) Field of Classification Search ......... 382/162, 382/165, 167, 181, 224, 225; 358/518, 523; 356/405; 250/559.05, 559.06, 559.07, 559.08
See application file for complete search history.

(56) References Cited

U.S. PATENT DOCUMENTS

| 5,412,737 | A | * | 5/1995 | Govrin ..................... 382/168 |
| 5,767,983 | A | | 6/1998 | Terashita |
| 5,925,889 | A | * | 7/1999 | Guillory et al. ....... 250/559.16 |
| 6,038,339 | A | | 3/2000 | Hubel et al. ............... 382/162 |
| 6,291,829 | B1 | * | 9/2001 | Allen et al. ........... 250/559.07 |
| 6,459,825 | B1 | * | 10/2002 | Lippincott ................ 382/312 |
| 6,819,792 | B1 | * | 11/2004 | Balasubramanian ....... 382/165 |

FOREIGN PATENT DOCUMENTS

| DE | 199 10 645 | 6/1999 |
| EP | 0 851 668 | 7/1998 |
| WO | WO 01/01671 | 1/2002 |

* cited by examiner

*Primary Examiner*—Vikkram Bali
*Assistant Examiner*—Colin LaRose

(57) ABSTRACT

A system and method for color correcting electronically captured input images utilizes a correlation between the input images and a set of reference images of different media types to determine the media type of the input images. In an exemplary embodiment, the correlation is performed using a media correlation matrix, which includes media characteristic data from the different media types. The media type information of the input images is used to customize the color correction procedure being performed on the input images. The customization of the color correction procedure ensures that the final images are accurate reproduction of the input images with respect calorimetric or perceptual match.

17 Claims, 4 Drawing Sheets

SYSTEM AND METHOD FOR COLOR CORRECTING ELECTRONICALLY CAPTURED IMAGES BY DETERMINING INPUT MEDIA TYPES USING COLOR CORRELATION MATRIX

FIELD OF THE INVENTION

The invention relates generally to the field of image processing, and more particularly to a system and method for color correcting electronically captured images of input media based on media types.

BACKGROUND OF THE INVENTION

Accurate rendering of input media with respect to color is an important criterion for digital imaging devices, such as flatbed and film scanners. Input media may include documents, photographs, films and other items that can be electronically captured by digital imaging devices. The color accuracy of a digital imaging device depends on the color correction computations performed by that digital imaging system to correct the color information in the captured images to accurately reproduce the original images on the input media. Color correction computations may involve the use of look-up tables, or linear or non-linear matrix techniques to modify the raw color signals, e.g., RGB signals, of the captured images such that the colors of the captured images are an accurate reproduction of the input with respect to colorimetric or perceptual match.

In general, the color gamut of raw color signals captured from a particular input medium depends the media type, as well as the digital imaging device that captured those color signals. Thus, the color gamuts of captured image signals from one media type are different from the color gamuts of captured image signals from another media type even if the same digital imaging device is used for both media types. As an example, the color gamuts of offset printed media differ from the color gamuts of inkjet printed media. Consequently, even if the filter responses of a digital imaging device are compensated by the color correction computations, the color accuracy of the digital imaging device can be significantly reduced when the media type is not taken into consideration. Thus, the color accuracy of a digital imaging device can be increased by tuning the color correction computations based on the media type of the input media.

Some conventional scanners utilize software that allows the user to select the input media type from a list of predefined media types. As an example, the predefined media types may include high-gloss photos, offset media and coated media. Depending on the user input, customized color correction computations are performed on the captured color signals in accordance with the selected media type, which increases the color accuracy of the scanners.

Although the user input method utilized by the conventional scanners may be appropriate for high end users, the user input method is not appropriate for ordinary users, who may not bother to select the media type, if such selection is made available in an accompanying software. For these ordinary users, the increased color accuracy derived from the media-dependent color correction computations is negated by user neglect or user interface design.

In view of the above concern, there is a need for a system and method for color correcting digitally captured images of input media based on automatic determinations of the media types.

SUMMARY OF THE INVENTION

A system and method for color correcting electronically captured input images utilizes a correlation between the input images and a set of reference images of different media types to determine the media type of the input images. In an exemplary embodiment, the correlation is performed using a media correlation matrix, which includes media characteristic data from the different media types. The media type information of the input images is used to customize the color correction procedure being performed on the input images. The customization of the color correction procedure ensures that the final images are accurate reproduction of the input images with respect calorimetric or perceptual match.

A method in accordance with the invention includes the steps of receiving color image data associated with an original image on an input medium and comparing the color image data to a plurality of reference image data that correspond to different reference media types to determine a candidate media type of the input medium from the different reference media types. In an exemplary embodiment, the method further includes the step of correcting color information contained in the color image data according to the candidate media type to provide a color-corrected electronic image of the original image on the input medium.

The step of comparing the color image data to the plurality of reference data may include correlating an image vector associated with the color image data to a media correlation matrix having columns of entries that are associated with different reference media types. In an embodiment, the image vector includes input media data corresponding to input media characteristics of the input medium. Furthermore, each column of the media correlation matrix includes reference media data corresponding to reference media characteristics of a particular media type of the different reference media types. The input and reference media characteristics may include color gamut, size, gloss, fluorescence, and presence of text and/or graphics. The reference media data of the media correlation matrix may include binary, weighted or probability information.

A system in accordance with the invention includes an image sensor that electronically captures an image on an input medium as color image data and a correlation unit that compares the color image data to a plurality of reference image data that correspond to different reference media types to determine a candidate media type of the input medium from the different reference media types. In an exemplary embodiment, the system further includes a color correction unit coupled to the correlation unit. The color correction unit is configured to correct color information contained in the color image data according to the candidate media type to provide a color-corrected electronic image of the original image on the input medium.

The correlation unit of the system may be configured to correlate an image vector associated with the color image data to a media correlation matrix having columns of entries that are associated with different reference media types. In an embodiment, the image vector includes input media data corresponding to input media characteristics of the input medium. Furthermore, each column of the media correlation matrix includes reference media data corresponding to reference media characteristics of a particular media type of the different reference media types. The input and reference media characteristics may include color gamut, size, gloss, fluorescence, and presence of text and/or graphics. The reference media data of the media correlation matrix may include binary, weighted or probability information.

Other aspects and advantages of the present invention will become apparent from the following detailed description, taken in conjunction with the accompanying drawings, illustrated by way of example of the principles of the invention.

DETAILED DESCRIPTION

Figure 1:
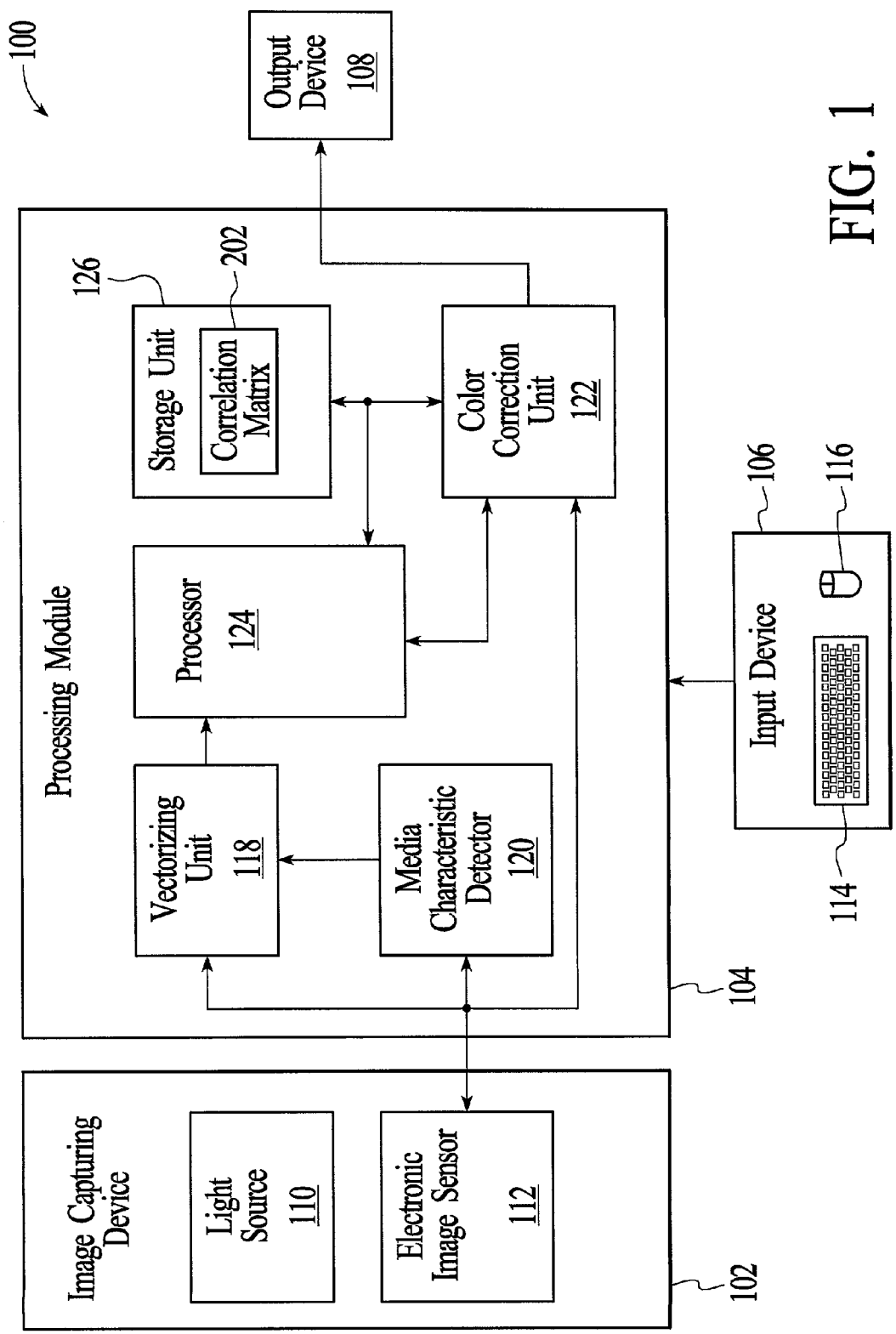
FIG. 1 is a block diagram of a digital imaging system in accordance with the present invention.

With reference to FIG. 1, a digital imaging system 100 in accordance with the present invention is shown. The digital imaging system operates to automatically determine the media type of the input medium being captured to color correct a captured image based on the determined media type. Thus, the digital imaging system reproduces original images on different input media with accurate rendering of the colors of the original images.

As shown in FIG. 1, the digital imaging device 100 includes an image capturing device 102, a processing module 104, an input device 106 and an output device 108. The image capturing device operates to electronically capture original images on different media. The image capturing device includes a light source 110 and an electronic image sensor 112. The light source provides a constant illumination on an input medium being imaged by the image capturing device. As an example, the light source may be a linear fluorescent lamp or a series of light emitting diodes. The electronic image sensor of the image capturing device operates to detect the illumination reflected from the input medium to electronically capture the original image on the input medium as raw image data, e.g. RGB signals. Alternatively, the electronic image sensor may detect the illumination transmitted through the input medium, such as a film. As an example, the electronic image sensor may be a charge coupled device (CCD) sensor or a complementary metal oxide semiconductor (CMOS) sensor. The image capturing device may be any imaging device, such as a flatbed scanner or a film scanner. In order to provide a more lucid description of the image capturing device, other components that are commonly found in a conventional image capturing device are not shown or described herein.

The input device 106 of the digital imaging system 100 allows a user to input commands into the system. In addition, the input device allows the user to input information relating to the input medium being captured by the system. As explained below, the media type determination may take into consideration information manually provided by the user. In one embodiment, the input device includes a computer keyboard 114 and a cursor pointing mechanism 116, as illustrated in FIG. 1. However, the input device may be any type of electronic input device (such as a button on a scanner).

The output device 108 of the digital imaging system 100 produces a final color image of the original image on the input medium that was imaged by the system. The output device may be a color printer that produces a hard copy of the final color image. Alternatively, the output device may be a computer monitor that electronically produces the final color image for viewing.

The processing module 104 of the digital imaging system 100 operates to determine the media type of the input medium from the image data acquired by the image capturing device 102, and to color correct the raw image data according to the media type determination to improve the color accuracy of the electronically captured image. The media type determination is achieved by comparing predefined indicators from the input medium with corresponding reference indicators from different reference media. The main indicator is the color range (color gamut) of captured image signals. Other indicators may include size, gloss, and fluorescence of the input medium.

Figure 2:
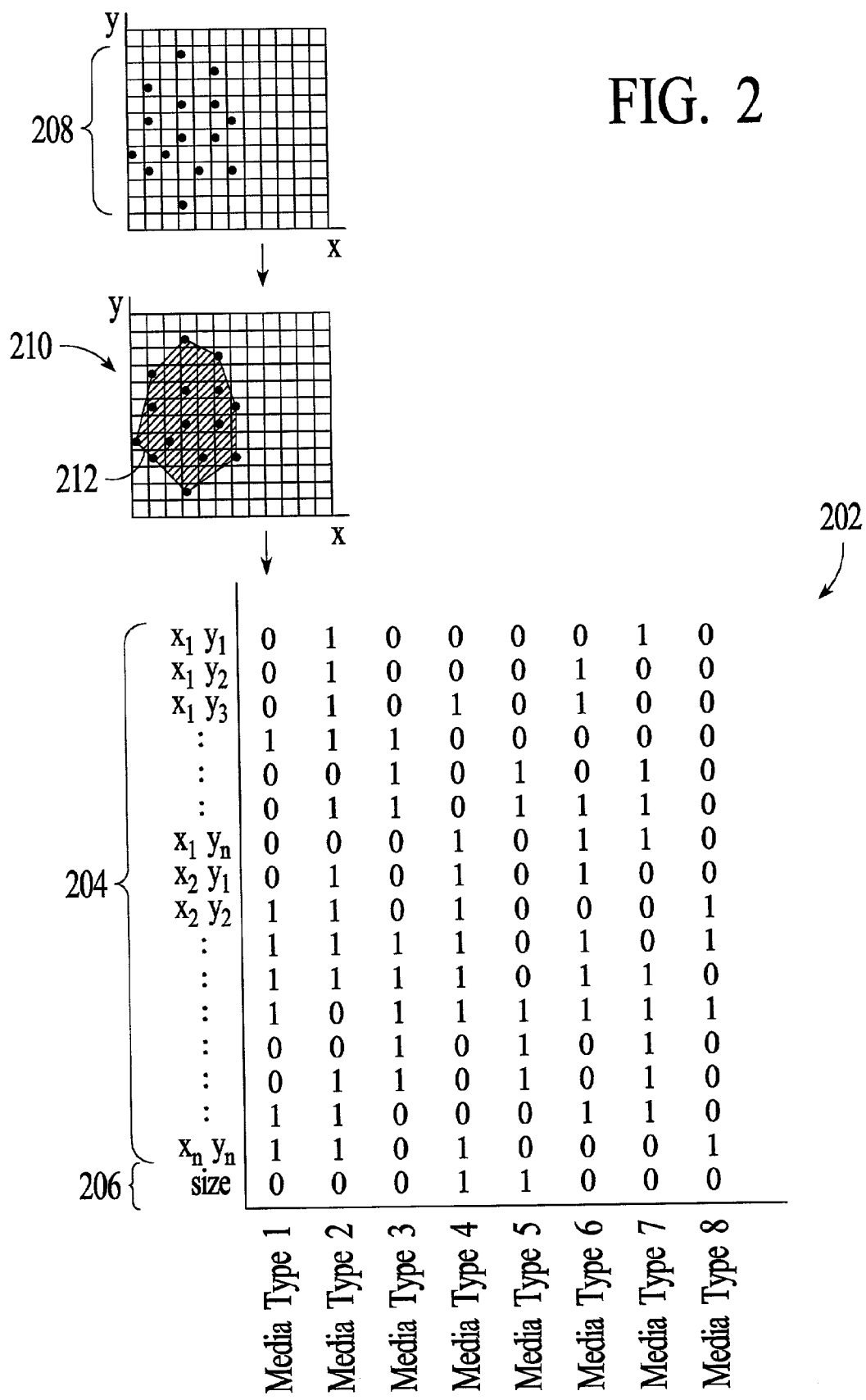
FIG. 2 is a diagram illustrating the generation of a correlation matrix used by the digital imaging system of FIG. 1.

The reference indicators are stored as a correlation matrix 202, as shown in FIG. 2. Each column of the correlation matrix includes reference indicators from a particular reference media type. The portion 204 of each column represents the indicator for color range, or the gamut, of the captured signals for a particular reference media type. In one embodiment, the entries in the portion 204 of the correlation matrix 202 include binary data. Thus, in this embodiment, the binary data entries indicate the presence or absence of specific colors for a particular reference media type. In another embodiment, the entries in the portion 204 of the correlation matrix 202 include probability data. Thus, in this embodiment, the probability data entries for a particular reference media type indicate the likelihood that an input medium of the same media type will contain the specific colors that correspond to the probability data entries. The portion 206 of each column represents the indicator for the size of a particular reference media type. As an example, the size indicator may indicate whether the reference media type is a 4"×6" medium, which would strongly suggest that the reference media type is a photograph. Although not shown in FIG. 2, the correlation matrix may include additional indicators, such as gloss, fluorescence, and presence of text and/or business graphics.

FIG. 2 illustrates the manner in which the correlation matrix 202 is built. A reference media type 1 is electronically captured by a test image capturing device (not shown). The reference media type 1 may be a photograph, a document (e.g., inkjet printed or laser tone printed), an offset printed medium or any other media type. Preferably, the test image capturing device has the same imaging characteristics as the image capturing device 102 of the digital imaging system 100. The signals obtained from the reference media type 1, e.g., RGB signals, are plotted as chromaticity coordinates 208 in a two-dimensional chromaticity space shown in FIG. 2, which is similar to the Commission Internationale de l'Eclairage (CIE) 1931 diagram. The gamut 210 for the reference media type 1 is then defined by taking the convex hull 212 of these chromaticity coordinates. The gamut includes all the chromaticity coordinates in the convex hull. The gamut for the media type 1 is then transformed into a linear form, or a vector, which forms the color range portion 204 of the column marked "media type 1" for the reference media type 1. The vector is built by scanning the gamut in the chromaticity space in a raster fashion and determining whether the coordinates of the chromaticity space are included in the gamut or not. A chromaticity coordinate that is included in the gamut is represented as a "1" in the correlation matrix, while a coordinate that is not included in the gamut is represented as a "0" in the matrix. Additional binary information for other indicators is then attached to the vector. For example, the binary information for the input size indicator may then be attached to the vector. If the input size of the reference media type 1 is the predetermined size, e.g., 4"×6", then the input size portion 206 of the media type 1 column is set to "1". Otherwise, the input size portion of the media type 1 column is set to "0". As illustrated in FIG. 2, the input size portion 206 of the media type 1 column is set to "0", which indicates that the reference media type 1 is not of the predetermined size. Other indicators may also be included in the media type 1 column as additional binary information. In other embodiments, the number corresponding to the additional indicators (i.e., size, gloss, fluorescence, and presence of text and/or business graphics) could be multiplied by weighting factors that would correspond to the importance of this information.

Figure 3:
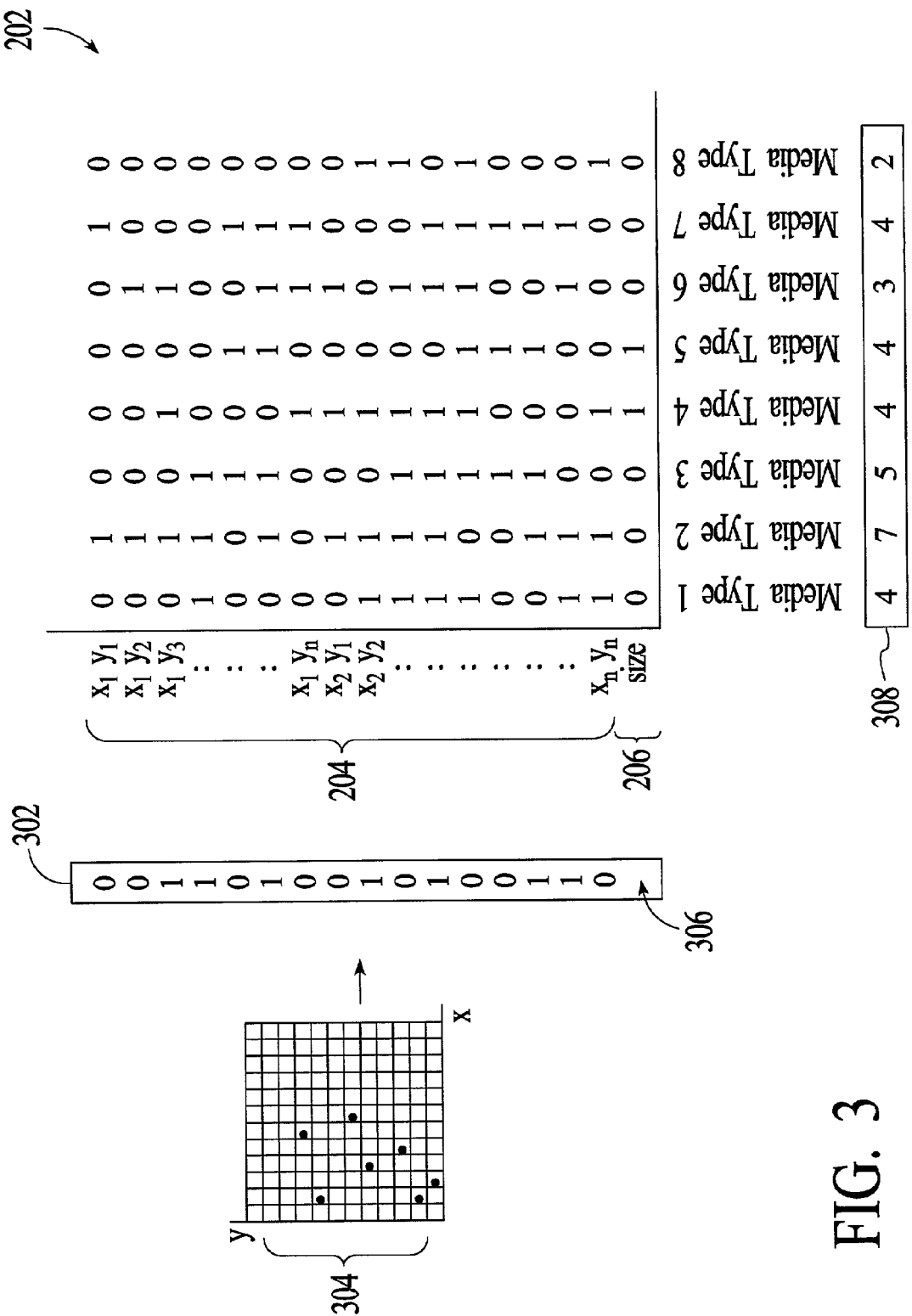
FIG. 3 is a diagram illustrating the conversion of captured image signals to an image vector, which is then multiplied by the correlation matrix.

Turning back to FIG. 1, the processing module 104 of the digital imaging system 100 includes a vectorizing unit 118, a media characteristic detector 120, a color correcting unit 122, a processor 124 and a storage unit 126. As shown in FIG. 3, the vectorizing unit 118 operates to build a vector 302 from captured image signals 304 of an input medium received from the image capturing device 102. The vector 302 is shown transposed in FIG. 3. This vector corresponds to the color range or color gamut portion 204 of the correlation matrix 202 and is built in the same manner as the correlation matrix columns for the portion 204. Thus, the vectorizing unit converts the captured image signals 304, e.g., RGB signals, to the chromaticity coordinates, and then defines the gamut (not shown) of the image signals by taking the convex hull of the chromaticity coordinates, as illustrated in FIG. 3. The vectorizing unit builds the vector by examining the chromaticity space with the plotted coordinates in a raster fashion, which is the same procedure for building the correlation matrix 202.

The media characteristic detector 120 of the processing module 104 measures additional media characteristics of the input medium to include additional indicators into the vector 302. The operation of the media characteristic detector depends on the additional indicators used by the digital imaging system 100 to determine the media type of the input medium. If one of the additional indicators is the input size, the media characteristic detector determines whether the size of the input medium is equal to a predefined size, e.g., 4"×6". The media characteristic detector outputs this information to the vectorizing unit 118, which attaches a "1" or a "0" to the vector 302 at the location 306 shown in FIG. 3, which corresponds to the portion 206 of the correlation matrix 202. The vectorizing unit attaches a "1" to the vector at the location 306 if the size of the input medium equals the predefined size. Otherwise, the vectorizing unit attaches a "0" to the vector at the location 306. Similarly, if one of the additional indicators is the fluorescence indicator, the media characteristic detector measures the fluorescence of the input medium and determines whether the measured fluorescence exceeds a predefined threshold. For this indicator, the vectorizing unit attaches a "1" to the vector at the appropriated location if the size of the input medium equals the predefined size. Otherwise, the vectorizing unit attaches a "0" to the vector at that location. Similar process may be performed by the media characteristic detector and the vectorizing unit for other indicators, such as the gloss of the input medium. In other embodiments, the number corresponding to the additional indicators (i.e., size, gloss, fluorescence, and presence of text and/or business graphics) could be multiplied by weighting factors that would correspond to the importance of this information.

The storage unit 126 of the processing module 104 functions as a storage medium to store the correlation matrix 202, as well as other information. The storage unit may be a hard disk drive, read-only memory (ROM) or other forms of memory. The storage unit may store a color correction look-up table or a color correction matrix that are commonly used for color correction. The color correction look-up table or the color correction matrix includes color correction computation information that are customized for the different reference media types.

The processor 124 of the processing module 104 performs the determination of the input media type by using the correlation matrix 202. The processor multiplies the transpose of the vector to the correlation matrix to derive correlation values 308 for the different reference media types, as illustrated in FIG. 3. The operation of the processor to derive the correlation values can be mathematically express as:

$$v^tM,$$

where v is the vector associated with the captured image signals and M is the correlation matrix. Each correlation value corresponds to the likelihood that the input medium matches the associated reference media type. Higher correlation value indicates higher likelihood of a match. In FIG. 3, the correlation value for the reference media type 2 is the highest value among the correlation values. Thus, the input medium most likely matches the reference media type 2.

The color correction unit 122 of the processing module 104 adaptively performs color correction computations on the captured image signals from the electronic image sensor 112 of the image capturing device 102 based on the "matched" reference media type determined by the processor 124. Thus, the color correction unit performs different color correction computations on the captured image signals depending on the matched reference media type. The color correction unit may use a color correction lookup table stored in the storage unit 126 to perform the color correction computations. Alternatively, the color correction unit may use a color correction matrix to perform the color correction computations. The color correction lookup table or the color correction matrix includes customized color correction computation information for the different reference media types. Color correction process using a color correction lookup table or a color correction matrix is well known and thus, is not described herein. The color corrected image signals are then transmitted to the output device 108 to produce a final color image of the original image on the input medium.

The vectorizing unit 118, the media characteristic detector 120, the processor 124 and the color correction unit 122 of the processing module 104 represent function blocks that can be embodied in any combination of software, hardware and firmware. In one embodiment, the operations performed by these components are executed by a digital signal processor (not shown) of a computer. In another embodiment, the components of the processing module may be integrated into the image capturing device 112.

Since the color correction computations performed by the color correction unit 122 are tailored to a particular media type that best represents the input medium being imaged by the digital imaging system 100, the colors of the original image on the input medium are more accurately replicated in the captured image. In addition, since the media type determination is made automatically by the processing module 104, the color accuracy of the digital imaging system is not dependent on the user input.

In an alternative embodiment, some or all of the additional media characteristics of the input medium, such as size, gloss and fluorescence, may be provided by user inputs. In this alternative embodiment, the user essentially operates as the media characteristic detector 120 of the processing module 102. As an example, the user may input whether the input medium is of a predefined size. The vectorizing unit 118 of the processing module 102 then attaches the appropriate binary information into the vector for that input medium. As another example, a user may indicate that the input media is a photograph, which would then refine the search by the processor to include only photographic material media types (e.g., KODAK, AGFA or FUJII paper). Other media characteristics may be attached to the vector in the same manner. If all of the additional media characteristics of the input medium are provided by the user, the media characteristic detector 120 is no longer needed in the digital imaging system 100 and thus, can be removed from the processing module 104.

Figure 4:
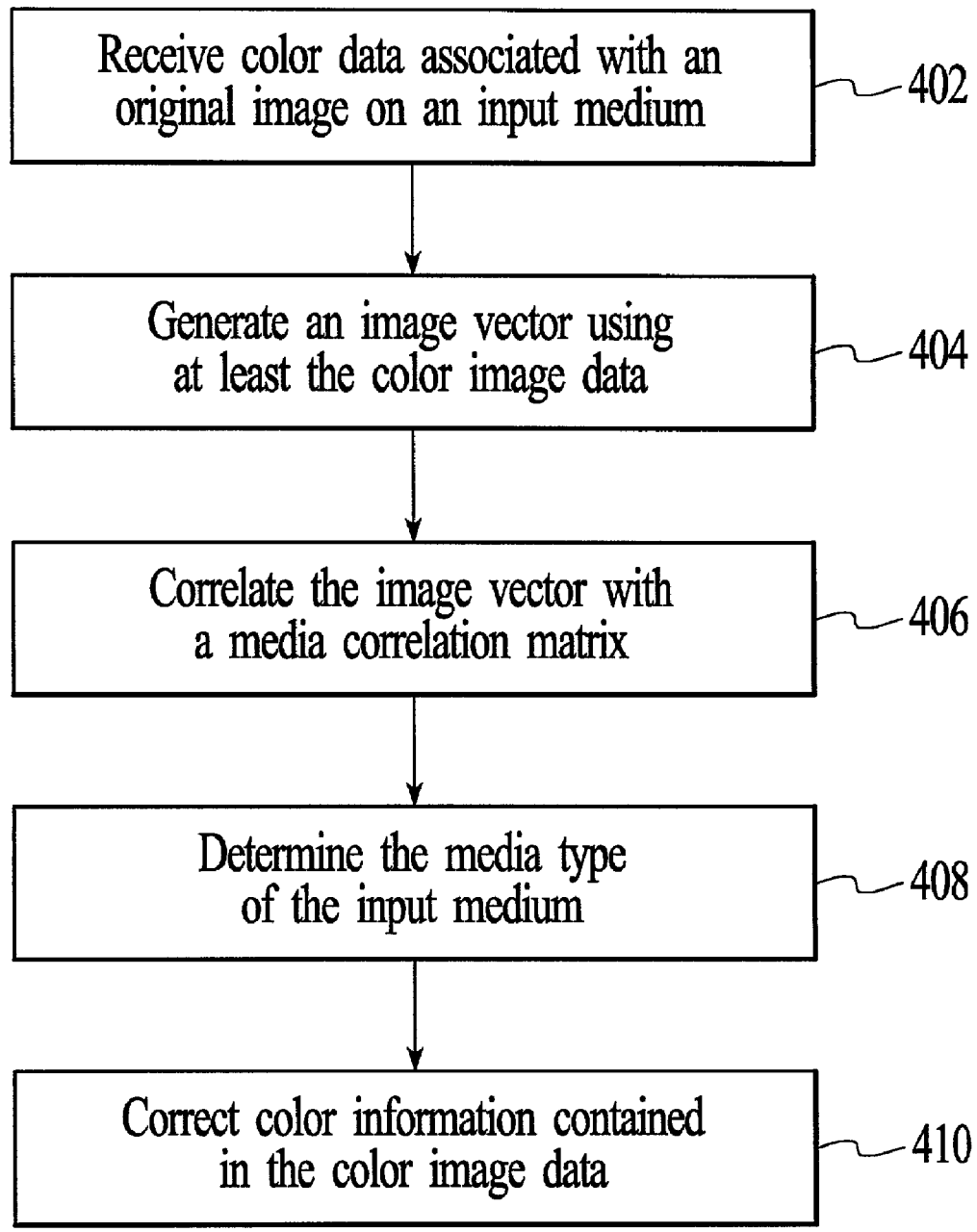
FIG. 4 is a flow diagram of a method of color correcting captured images in accordance with the invention.

A method of color correcting captured images in accordance with the invention is described with reference to FIG. 4. At step 402, a color image data associated with an original image on an input medium is received. Next, at step 404, an image vector is generated using at least the color image data. At step 406, the image vector is correlated with a media correlation matrix, which includes columns of entries that are associated with different reference media types. The entries correspond to media characteristics, such as color gamut, size, gloss, fluorescence, presence of text, and presence of business graphics. The entries of the media correlation matrix may be one of binary information, weighted information and probability information. Next, at step 408, the media type of the input medium is determined using the information derived from the correlation of the image vector with the media correlation matrix. At step 410, color information contained in the color image data is corrected according the determined media type to provide a color-corrected electronic image of the original image on the input medium.

The foregoing descriptions of specific embodiments of the invention have been presented for the purposes of illustration and description. These descriptions are not intended to be exhaustive or to limit the invention to the disclosed embodiments disclosed. Many modifications and variations are possible in light of the above teaching. The embodiments were chosen and described in order to explain the principles of the invention and its practical application, to thereby enable others skilled in the art to best utilize the invention for various uses. It is intended that the scope of the invention be defined by the claims appended hereto and their equivalents.

What is claimed is:

1. A method of processing different input media types comprising:

receiving color image data of an original color image on an input medium, said color image data including color range information of said original color image on said input medium; and comparing said color image data to a plurality of reference image data that include color range information of different reference media types to determine a candidate media type of said input medium from said different reference media types, including correlating an image vector associated with said color image data to a media correlation matrix, said media correlation matrix having columns of entries that are associated with said different reference media types.

2. The method of claim 1 wherein said image vector includes input media data corresponding to input media characteristics of said input medium, and wherein each of said columns of said media correlation matrix includes reference media data corresponding to reference media characteristics of a particular media type of said different reference media types.

3. The method of claim 2 wherein said input media characteristics and said reference media characteristics include a media characteristic selected from a group consisting of color gamut, size, gloss, fluorescence, presence of text, and presence of graphics.

4. The method of claim 2 wherein said reference media data of said correlation matrix includes binary information corresponding to a particular reference media characteristic of said reference media characteristics.

5. The method of claim 2 wherein said reference media data of said correlation matrix includes weighted information corresponding to a particular reference media characteristic of said reference media characteristics, said weighted data representing a degree of importance for said particular reference media characteristic to determine said candidate media type of said input medium.

6. The method of claim 2 wherein said reference media data of said correlation matrix includes probability information corresponding to a particular reference media characteristic of said reference media characteristics, said probability data representing a likelihood of a corresponding input media characteristic being present in said input medium.

7. The method of claim 2 further comprising a step of optically detecting some of said input media characteristics of said input medium to derive some of said input media data.

8. The method of claim 2 further comprising a step of manually inputting said input media data corresponding to one of said input media characteristics of said input medium.

9. The method of claim 1 further comprising a step of correcting color information contained in said color image data according to said candidate media type to provide a color-corrected electronic image of said original color image on said input medium.

10. A system for processing different input media types comprising:

an image sensor that electronically captures an original color image on an input medium as color image data, said color image data including color range information of said original color image on said input medium; and a correlation unit that compares said color image data to a plurality of reference image data that include color range information of different reference media types to determine a candidate media type of said input medium from said different reference media types, said correlation unit being configured to correlate an image vector associated with said color image data to a media correlation matrix, said media correlation matrix having columns of entries that are associated with said different reference media types.

11. The system of claim 10 wherein said image vector includes input media data corresponding to input media characteristics of said input medium, and wherein each of said columns of said media correlation matrix includes reference media data corresponding to reference media characteristics of a particular media type of said different reference media types.

12. The system of claim 11 further comprising an input device that allows a user to manually input some of said input media data.

13. The system of claim 11 wherein said input media characteristics and said reference media characteristics include a media characteristic selected from a group consisting of color gamut, size, gloss, fluorescence, presence of text, and presence of graphics.

14. The system of claim 11 wherein said reference media data of said correlation matrix includes binary information corresponding to a particular reference media characteristic of said reference media characteristics.

15. The system of claim 11 wherein said reference media data of said correlation matrix includes weighted information corresponding to a particular reference media characteristic of said reference media characteristics, said weighted data representing a degree of importance for said particular reference media characteristic to determine said candidate media type of said input medium.

16. The system of claim 11 wherein said reference media data of said correlation matrix includes probability information corresponding to a particular reference media characteristic of said reference media characteristics, said probability data representing a likelihood of a corresponding input media characteristic being present in said input medium.

17. The system of claim 10 further comprising a color correction unit coupled to said correlation unit, said color correction unit being configured to correct color information contained in said color image data according to said candidate media type to provide a color-corrected electronic image of said original color image on said input medium.

* * * * *